(12) United States Patent
Shoji

(10) Patent No.: US 8,279,339 B2
(45) Date of Patent: Oct. 2, 2012

(54) PROJECTION DISPLAY AND PROJECTION DISPLAY CONTROL PROGRAM

(75) Inventor: Takuro Shoji, Kanagawa (JP)

(73) Assignee: Sony Corporation (JP)

( * ) Notice: Subject to any disclaimer, the term of this patent is extended or adjusted under 35 U.S.C. 154(b) by 735 days.

(21) Appl. No.: 12/231,060

(22) Filed: Aug. 28, 2008

(65) Prior Publication Data

US 2009/0080789 A1    Mar. 26, 2009

(30) Foreign Application Priority Data

Aug. 31, 2007   (JP) ................................ P2007-226320

(51) Int. Cl.
*H04N 7/01* (2006.01)
*H04N 11/20* (2006.01)

(52) U.S. Cl. ........ 348/441; 348/443; 348/446; 348/456; 348/554; 348/563; 348/569; 348/734; 348/749; 348/745

(58) Field of Classification Search .................. 348/441, 348/554, 744, 569, 563, 734, 745, 443, 446, 348/456

See application file for complete search history.

(56) References Cited

U.S. PATENT DOCUMENTS

| | | | |
|---|---|---|---|
| 7,206,025 B2* | 4/2007 | Choi | 348/441 |
| 7,911,533 B2* | 3/2011 | Kondo et al. | 348/441 |
| 2002/0063807 A1* | 5/2002 | Margulis | 348/745 |
| 2003/0206242 A1* | 11/2003 | Choi | 348/441 |
| 2007/0024757 A1* | 2/2007 | Kondo et al. | 348/602 |
| 2007/0279523 A1* | 12/2007 | Yamauchi | 348/441 |

FOREIGN PATENT DOCUMENTS

| | | |
|---|---|---|
| CN | 1882059 A | 12/2006 |
| JP | 2002-006818 A | 1/2002 |
| JP | 2003-186456 A | 7/2003 |
| JP | 2005-122201 A | 5/2005 |
| JP | 2006058891 A | 3/2006 |
| JP | 2006-259624 A | 9/2006 |
| JP | 2006-259689 A | 9/2006 |

OTHER PUBLICATIONS

Office Action from Chinese Application No. 200810212454.X, dated Feb. 24, 2010.

* cited by examiner

*Primary Examiner* — Jefferey Harold
*Assistant Examiner* — Mustafizur Rahman
(74) *Attorney, Agent, or Firm* — Lerner, David, Littenberg, Krumholz & Mentlik, LLP

(57) ABSTRACT

A projection display may include a frame rate conversion section selectively performing a first frame rate conversion process or a second frame rate conversion process, an image process section selectively performing a black insertion process or a pair-frames gamma process, and outputting a result as a pair of consecutive image frames, a projection display section projecting and displaying an image on the basis of the video signal processed by the frame rate conversion section or the image process section, and a control section controlling the frame rate conversion section or the image process section according to a selected operation on a menu screen, where the control section performs the user interface function so that the black insertion process or the pair-frames gamma process by the image process section is selected with priority over the first frame rate conversion process by the frame rate conversion section.

10 Claims, 17 Drawing Sheets

| IMAGE DISPLAY MODE | FUNCTION | FEATURE |
|---|---|---|
| INTERMEDIATE FRAME GENERATION MODE (HFR on) | DOUBLING FRAME RATE BY INSERTING GENERATED FRAME IN INTERMEDIATE POSITION | · IMAGE IS SMOOTHLY AND NATURALLY DISPLAYED |
| BLACK INSERTION MODE | IN HFR SIMPLE TWICE WRITE MODE, EVEN FRAME IS REPLACED WITH BLACK FRAME | · IMAGE BLUR BY HOLD EFFECT IS IMPROVED<br>· LUMINANCE DEGRADATION IS LARGE |
| AB GAMMA MODE | IN HFR SIMPLE TWICE WRITE MODE, ODD FRAME: A GAMMA/WHITE EVEN FRAME: B GAMMA/BLACK | · IMAGE BLUR BY HOLD EFFECT IS IMPROVED<br>· LUMINANCE DEGRADATION IS SMALL |

FIG. 12

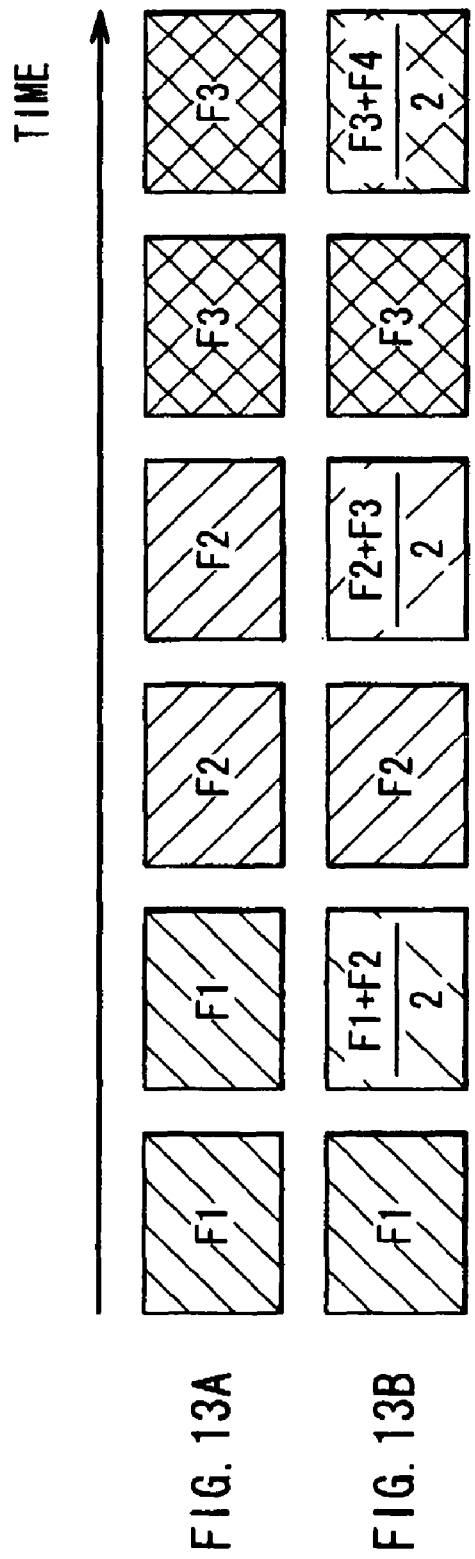

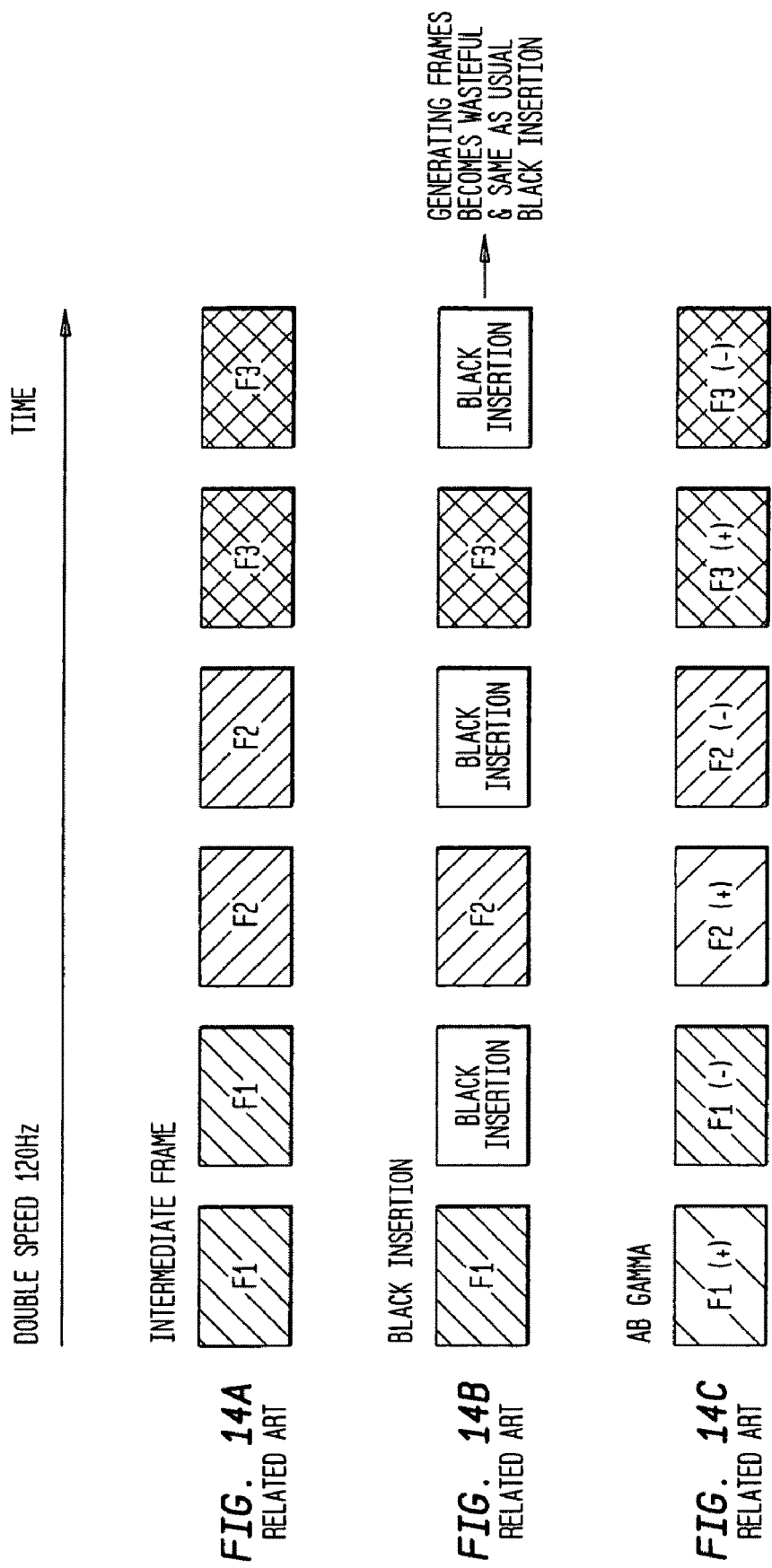

PROJECTION DISPLAY AND PROJECTION DISPLAY CONTROL PROGRAM

CROSS-REFERENCE TO RELATED APPLICATIONS

The present application claims priority from Japanese Patent Application No. JP 2007-226320, filed in the Japanese Patent Office on Aug. 31, 2007, the entire content of which is incorporated herein by reference.

BACKGROUND OF THE INVENTION

1. Field of the Invention

The present invention relates to a projection display which is a so-called projector, and a projection display control program applied to such a projection display. In particular, the present invention relates to the projection display equipped with a user interface which enables users to arbitrarily set display modes, and to the projection display control program which realizes such a user-interface.

2. Description of the Related Art

When images are displayed on a liquid crystal display, a certain amount of electric charges are necessarily accumulated in pixels. The accumulated pixels are maintained until next image is displayed so that an image blur caused by a so-called hold effect is generated. In order to improve the resolution of moving images influenced by the hold effect, the following methods have been proposed.

The first method is a so-called black insertion mode in which a black image frame is inserted between a frame F1 and a frame F2 of an original image, for example, as shown in FIG. 10 (refer to Japanese Unexamined Patent Publication No. 2003-186456). The second method is a so-called AB gamma correction mode in which the frame F1 of an original image is transformed into an A gamma correction image F1 (+) which is subjected to a white gamma correction, and a B gamma correction image F1 (−) which is subjected to a black gamma correction, and then the A gamma correction image F1 (+) and the B gamma correction image F1 (−) are alternately displayed, for example, as shown in FIG. 11 (refer to Japanese Unexamined Patent Publication No. 2006-58891).

As shown in FIG. 12, in the black insertion mode, although the image blur caused by the hold effect may be improved, a luminance degradation is large. On the other hand, in the AB gamma correction mode, the image blur caused by the hold effect may be improved, and the luminance degradation is relatively small.

For example, in the case of moving image whose movement is active like TV sports program, the image difference between frames is large, and thus the movement of images may be seen unnatural with the usual frame rate (for example, 60 Hz). To solve this issue, for example as shown in FIG. 13B, there has been proposed a method which is a so-called high frame rate (HFR) mode in which an intermediate frame (F1+F2)/2 is generated on the basis of adjacent two image frames F1 and F2, and the intermediate frame is inserted between the frame F1 and the frame F2 so that the frame rate is increased twice. Furthermore, in FIG. 13A, there is shown a method (simple double-speed mode) in which each image frame is simply written twice, and thereby the frame rate is increased twice. As shown in FIG. 12, the HFR mode has a feature that moving images may be smoothly and naturally displayed.

SUMMARY OF THE INVENTION

Among the various display modes described above, the black insertion mode and the AB gamma correction mode reduce the image blur caused by afterimage of the moving images, and realize crisp image qualities as shown in typical film-type movies. Accordingly, the black insertion mode and the AB gamma correction mode may be referred to as a so-called cinema mode or a film projection mode. On the other hand, the aim of the HFR mode is smoothly and naturally displaying images whose movement is active, and thus the HFR mode is suitable for the case when watching a relay broadcast of a soccer game by a TV receiver. Accordingly, the HFR mode may be referred to as a so-called motion enhance mode. That is, the film projection mode and the motion enhance mode aim at different types of image qualities.

In the image display, there are a display of direct display type such as a typical TV receiver, and a display of projection type (projector) as well. In the latter one, there is a so-called front projector in which an image is projected from the front side of a screen, and the image is watched from the same side. The front projector is popular especially among maniacs who prefer cinema-like images (images similar to film-type movies).

However, in this type of projector, it is thought that not only the film projection mode, but also the motion enhance mode may be equipped, in consideration of the versatility of the product (various users). In this case, the maniac viewers know what kind of image qualities they prefer and the difference of the display modes. Thus, it hardly becomes an issue for the maniac viewers, in comparison with the case of typical TV viewers. However, it is expected that typical users (users who are different from maniacs) will have difficulties to select one of the modes according to image sources.

In the case of an interface in which users may select both of the modes at the same time, the operation of hardware so as to realize each of the functions may be pointless. For example, when both of the film projection mode and the motion enhance mode are selected at the same time, although the intermediate frames are produced as shown in FIG. 14A, the intermediate frames are replaced with the black frames as shown in FIG. 14B, or the produced intermediate frames are unused because the AB gamma correction is performed on the original frame as shown in FIG. 14C. Thus, this may lead to wasting of hardware resources, and it is inappropriate from the viewpoint of the product suitability.

In view of the foregoing, it is desirable to provide an appropriate user interface which brings no confusion to users, and a projection display which has excellent product characteristics and a projection display control program capable of realizing such a projection display.

According to an embodiment of the present invention, there is provided a first projection display which may have a frame rate conversion means for selectively performing a first frame rate conversion process or a second frame rate conversion process, the first frame rate conversion process increasing a frame rate by interpolating an intermediate image frame between image frames of an input video signal, the second frame rate conversion process increasing the frame rate by repeatedly outputting each image frame of the input video signal along a time axis, an image process means for selectively performing a black insertion process or a pair-frames gamma process, and outputting a result as a pair of consecutive image frames, the black insertion process inserting a black frame between image frames of the input video signal, the pair-frames gamma process performing a pair of gamma conversion processes, each having different gamma characteristics, to a series of image frames in the input video signal, a projection display means for projecting and displaying an image on the basis of the video signal processed by the frame rate conversion means or the image process means, and a control means for controlling the frame rate conversion means or the image process means according to a selected operation on a menu screen, the control means having a user interface function for displaying the menu screen which enables a user to select the first or the second frame rate conversion processes by the frame rate conversion means, the black insertion process, or the pair-frames gamma process by the image process means. The control means may perform the user interface function so that the black insertion process or the pair-frames gamma process by the image process means is selected with priority over the first frame rate conversion process by the frame rate conversion means. Here, in the case that a mode for performing the black insertion process or the pair-frames gamma process is selected on the menu screen, the control means may preferably hide a selection button which enables a mode for performing the first frame rate conversion process to be selected.

According to an embodiment of the present invention, there is provided a projection display control program applied to a projection display which may include a frame rate conversion means for selectively performing a first frame rate conversion process or a second frame rate conversion process, the first frame rate conversion process increasing a frame rate by interpolating an intermediate image frame between image frames of an input video signal, the second frame rate conversion process increasing the frame rate by repeatedly outputting each image frame of the input video signal along a time axis, an image process means for selectively performing a black insertion process or a pair-frames gamma process, and outputting a result as a pair of consecutive image frames, the black insertion process inserting a black frame between image frames of the input video signal, the pair-frames gamma process performing a pair of gamma conversion processes, each having different gamma characteristics, to a series of image frames in the input video signal, a projection display means for projecting and displaying an image on the basis of the video signal processed by the frame rate conversion means or the image process means, and a control means for controlling the frame rate conversion means or the image process means. The projection display control program is configured to be executed by the control means, and which may include performing a user interface function for displaying a menu screen which enables a user to select the first or the second frame rate conversion processes by the frame rate conversion means, the black insertion process or the pair-frames gamma process by the image process means, and controlling the frame rate conversion means or the image process means according to a selected operation on the menu screen. The user interface function may be executed so that the black insertion process or the pair-frames gamma process by the image process means is selected with priority over the first frame rate conversion process by the frame rate conversion means.

According to an embodiment of the present invention, in the first projection display or the projection display control program, the frame rate conversion means or the image process means may be controlled according to the selected operation on the menu screen of the user interface function. When the operation is selected on the menu screen, the black insertion process or the pair-frames gamma process (AB gamma correction process) by the image process means may be selected with priority over the first frame rate conversion process (intermediate image frame generation and insertion process) by the frame rate conversion means.

According to an embodiment of the present invention, there is provided a second projection display which may include a projection display means for projecting and displaying an image according to a video signal, and a display mode set means having a user interface function for selectively setting a display mode of an image to be projected and displayed by the projection display means. The display mode set means may perform the user interface function so that a second image display mode with image display characteristics which are closer to image qualities of movies is selected with priority over a first image display mode with display characteristics which enable moving picture to be displayed more smoothly.

According to an embodiment of the present invention, in the second projection display, the second image display mode may be selected with priority from the two image display modes so that the display is performed with priority with the image display characteristics closer to image qualities of movies (cinema-like image display characteristics).

According to an embodiment of the present invention, in the first projection display or the projection display control program, a mode for performing the black insertion process or the pair-frames gamma process (AB gamma correction process) may be selected with priority over a display mode for performing the intermediate image frame generation and insertion process. Thus, the appropriate user interface which brings no confusion to users may be provided, and excellent product characteristics may be obtained.

According to the second projection display of an embodiment of the present invention, the second image display mode may be selected with priority from the two image display modes each having different image display characteristics. Thus, the appropriate user interface which brings no confusion to users may be provided, and excellent product characteristics may be obtained.

Other and further objects, features and advantages of the invention will appear more fully from the following description.

BRIEF DESCRIPTION OF THE DRAWINGS

FIG. 9D is a view showing the image frames when a motion enhance mode is on.

FIG. 12 is a table showing characteristics of each display mode.

FIGS. 13A and 13B are views comparatively illustrating a simple double-speed mode and a high frame rate.

FIGS. 14A, 14B, and 14C are views illustrating comparison between the display modes in a display of the related art.

DETAILED DESCRIPTION

Preferred embodiments (hereinafter, simply referred to as embodiments) of the present invention will be described in detail with reference to the accompanying drawings.

Figure 1:
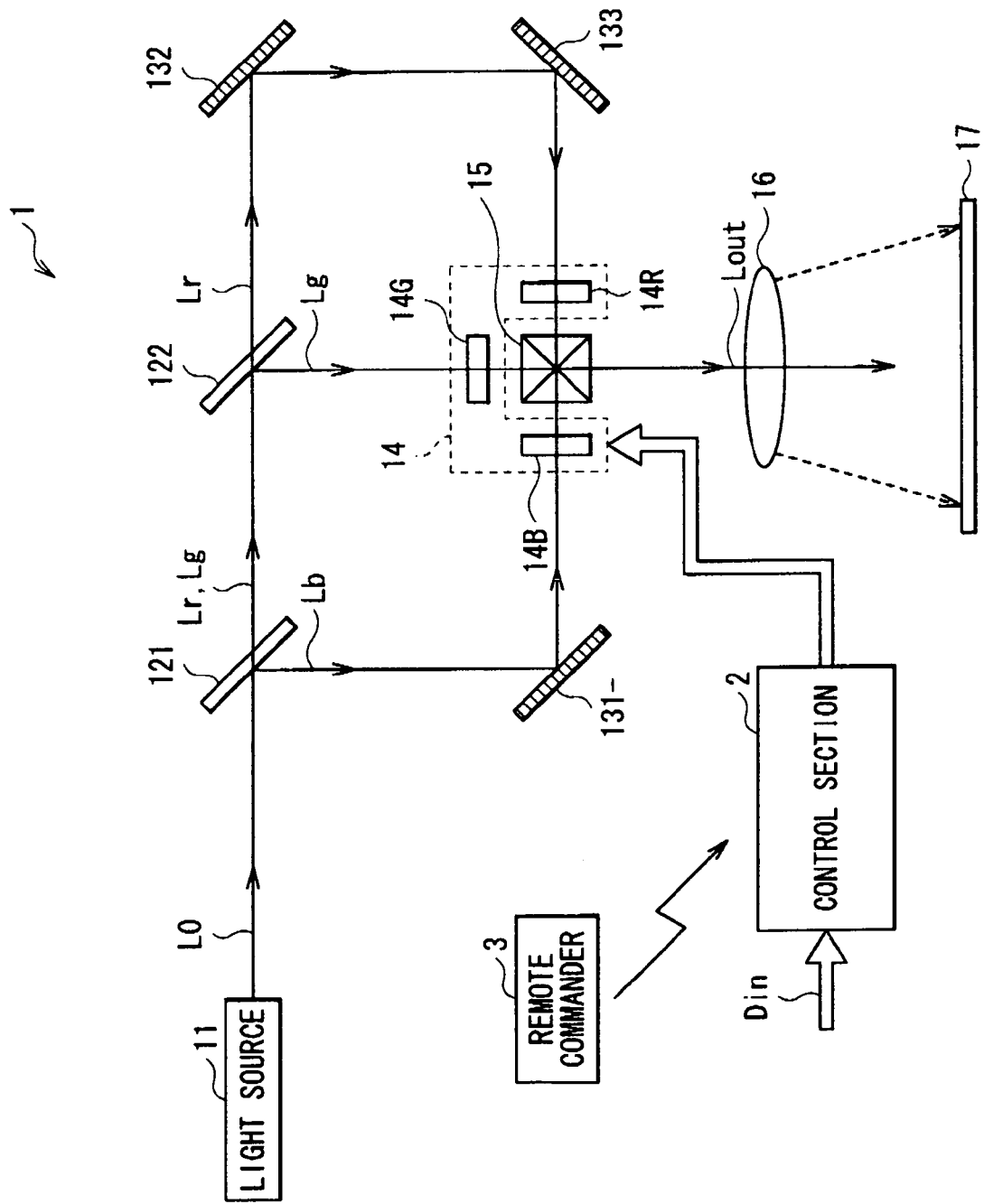
FIG. 1 is an overall outline configuration view illustrating a liquid crystal projector according an embodiment of the present invention.

FIG. 1 illustrates an overall configuration of a liquid crystal projector as a projection display of an embodiment of the present invention. Because a projection display control program according to the embodiment of the present invention is realized by applying it to the liquid crystal projector of FIG. 1, the projection display control program will be also described hereinafter.

The liquid crystal projector performs a projection display of images on the basis of an input video signal Din supplied from external, and includes a projection display optical system 1, a light source 11, and a control section 2 controlling the projection display optical system 1. In the control section 2, various operation settings are made according to an operation by a user using a remote commander 3. Here, the projection display optical system 1 corresponds to a specific example of "a projection display means" in the present invention.

The light source 11 emits a white light (an illumination light L0) including primary color lights of a red light Lr, a green light Lg, and a blue light Lb which are necessary for color image display. The light source 11 is, for example, composed of a halogen lamp, a metal halide lamp, or a xenon lamp.

The projection display optical system 1 includes dichroic mirrors 121 and 122, reflection mirrors 131, 132, and 133, a light modulator 14, a dichroic prism 15, a projection lens 16, and a screen 17. The dichroic mirror 121 transmits the red light Lr and the green light Lg of the illumination light L0 emitted from the light source 11 but reflects the blue light Lb, and thus the red light Lr and the green light Lg, and the blue light Lb are separated and proceed. Between the red light Lr and the green light Lg transmitted through the dichroic mirror 121, the dichroic mirror 122 transmits the red light Lr but reflects the green light Lg, and thus the red light Lr, and the green light Lg are separated and proceed. The green light Lg reflected by the dichroic mirror 122 proceeds in a direction of the light modulator 14. The reflection mirror 131 reflects the blue light Lb reflected by the dichroic mirror 121, in the direction of the light modulator 14. The reflection mirrors 132 and 133 reflect the red light Lr reflected by the dichroic mirror 122, in the direction of the light modulator 14.

The light modulator 14 includes three transmissive liquid crystal elements 14R, 14G, and 14B corresponding to the red light Lr, the green light Lg, and the blue light Lb, respectively, and modulates each of the primary color lights (the red light Lr, the green light Lg, and the blue light Lb) of the illumination light L0 emitted from the light source 11, on the basis of video signals for each color supplied from the control section 2. Specifically, the liquid crystal element 14R is disposed between the reflection mirror 133 and the dichroic prism 15 so as to modulate the entering red light Lr, on the basis of the video signal for a red color supplied from the control section 2. The liquid crystal element 14G is disposed between the dichroic mirror 122 and the dichroic prism 15 so as to modulate the entering green light Lg, on the basis of the video signal for a green color supplied from the control section 2. The liquid crystal element 14B is disposed between the reflection mirror 131 and the dichroic prism 15 so as to modulate the entering blue light Lb, on the basis of the video signal for a blue color supplied from the control section 2. Each of the liquid crystal elements 14R, 14G, and 14B has, for example, a configuration in which a pair of substrates are provided with a liquid crystal layer including liquid crystal molecules in between, the pair of substrates subjected to an application of a drive voltage on the basis of the video signal.

The dichroic prism 15 mixes the red light Lr, the green light Lg, and the blue light Lb modulated by the liquid crystal elements 14R, 14G, and 14B, respectively, so as to make a mixed light (display light) Lout. The dichroic prism 15 also leads the display light Lout to proceed on a light path (on the light path to the projection lens 16). The projection lens 16 is disposed between the dichroic prism 15 and the screen 17, and serves as a lens projecting the display light Lout generated by the dichroic prism 15, on the screen 17.

Figure 2:
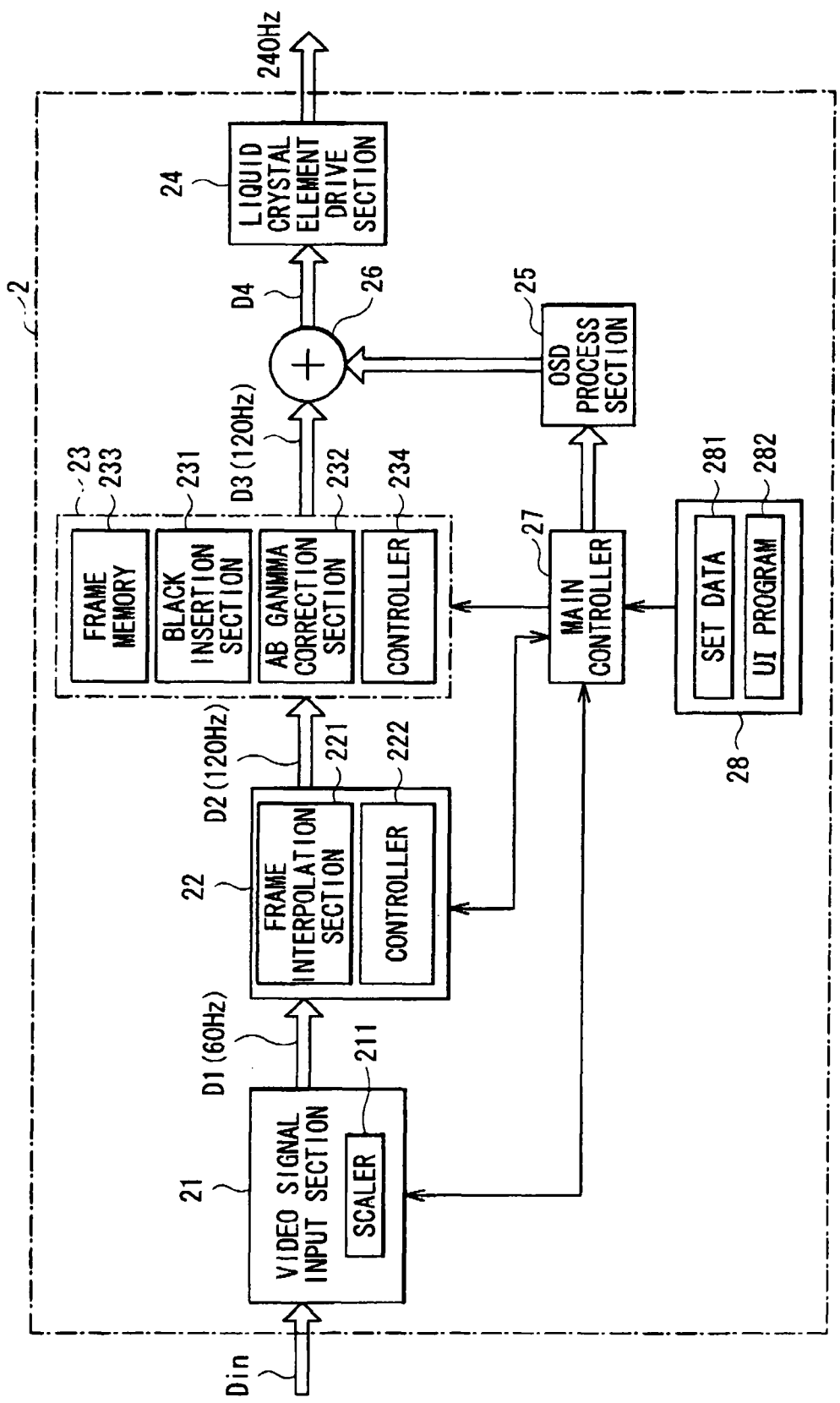
FIG. 2 is a block diagram illustrating a circuit configuration of a control section in the liquid crystal projector of FIG. 1.

FIG. 2 shows a detailed configuration of the control section 2. The control section 2 includes a video signal input section 21, a frame rate converter 22, a display engine 23, a liquid crystal element drive section 24, an OSD (on-screen display) process section 25, a synthesis section 26, a main controller 27, and a memory 28. Here, the frame rate converter 22 corresponds to a specific example of "a frame rate conversion means" in the present invention, the display engine 23 corresponds to a specific example of "an image process means" in the present invention, and the main controller 27 corresponds to a specific example of "a control means" or "a display mode set means" in the present invention.

The video signal input section 21 is a block to which the input video signal Din is inputted. The video signal input section 21 has a scaler 211 scaling an aspect ratio of the video signal, and an image adjustment section (not shown in the figure) performing a white balance adjustment in which a color temperature of the video signal is adjusted, and a so-called gamma correction so as to generate a video signal D1 (data D1 before being adjusted). Here, the frame rate of the video signal D1 is described as 60 Hz.

Figure 3:
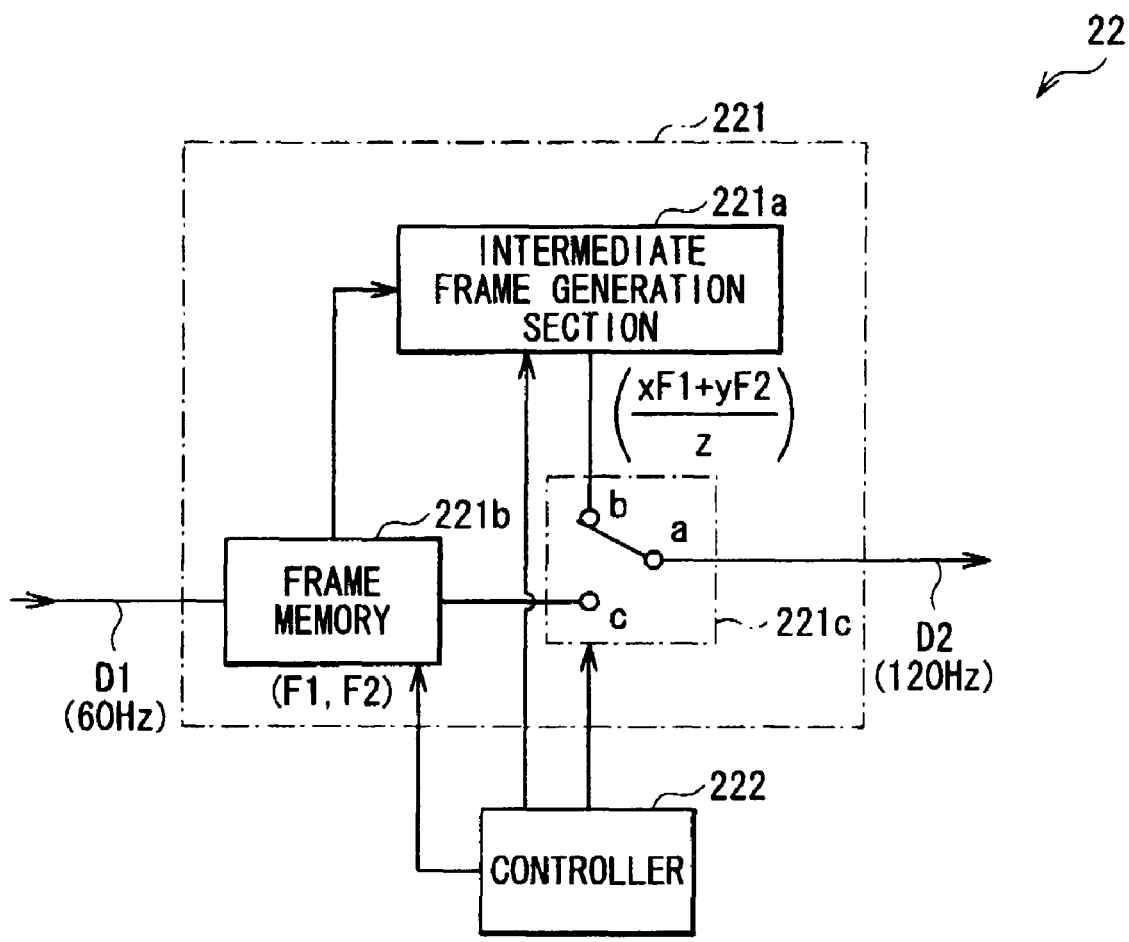
FIG. 3 is a block diagram illustrating a detailed circuit configuration of a frame rate converter in the control section shown in FIG. 2.

The frame rate converter 22 is a circuit which converts the frame rate of the video signal D1 to be doubled as 120 Hz, and outputs as a video signal D2. For example as shown in FIG. 3, the frame rate converter 22 includes a frame interpolation section 221, and a controller 222 controlling the frame interpolation section 221. The frame interpolation section 221 serves as a motion enhancer improving smoothness of the image as a moving image, and includes, for example, an intermediate frame generation section 221a, a frame memory 221b, and a switch 221c. The frame memory 221b stores at least 2 frames (F1 and F2) of the image frames of the video signal D1. Writing on the frame memory 221b is performed with the frame rate of 60 Hz. On the other hand, reading from the frame memory 221b is performed with the frame rate of 120 Hz.

Here, a mode in which the frame interpolation section 221 is selected and functions effectively is referred to as a motion enhance mode or a high frame rate on (HFR-on) mode, and this mode corresponds to a specific example of "a first moving image display mode" in the present invention.

On the basis of the image frames F1 and F2 read from the frame memory 221b, the intermediate frame generation section 221a generates an intermediate frame F12=(xF1+yF2)/z as an intermediate image between the image frames F1 and F2. When the motion enhance mode is selected (HFR-on) in the user interface which will be described later, the switch 221c alternately performs a changeover between a contact "b" and a contact "c" with the frame rate of 120 Hz by the control of the controller 222, and thus the intermediate frame F12 generated in the intermediate frame generation section 221a is inserted and outputted between the pair of image frames F1 and F2 which are read from the frame memory 221b. This operation is repeated so that image frame columns (F1, F2, F3, . . . ) of the video signal D1 having the frame rate of 60 Hz are converted to the image frame columns (F1, F12, F2, F23, F3, F34, F4, . . . ) of the video signal D2 having the frame rate of 120 Hz (refer to FIG. 9D which will be described later). In addition, coefficients (x, y, and z) used for generating the intermediate frames are set by the controller 222.

On the other hand, when the motion enhance mode is not selected (HFR-off), the switch 221c is fixed to the side of the frame memory 221b (the contact "c"). The controller 222 repeatedly performs a twice-read operation for each of the image frames (F1, F2, F3, . . . ) of the video signal D1 from the frame memory 221b, and performs a twice-write operation so as to output the video signal D2 having the frame rate of 120 Hz (refer to FIG. 9A). Thereby, in both of the cases where the HFR mode is on/off, the frame rate is converted from 60 Hz to 120 Hz.

Here, the process of generating and inserting the intermediate frame corresponds to a specific example of "a first frame rate conversion process" in the present invention. The twice-write process of the image frame corresponds to a specific example of "a second frame rate conversion process" in the present invention.

Figure 4:
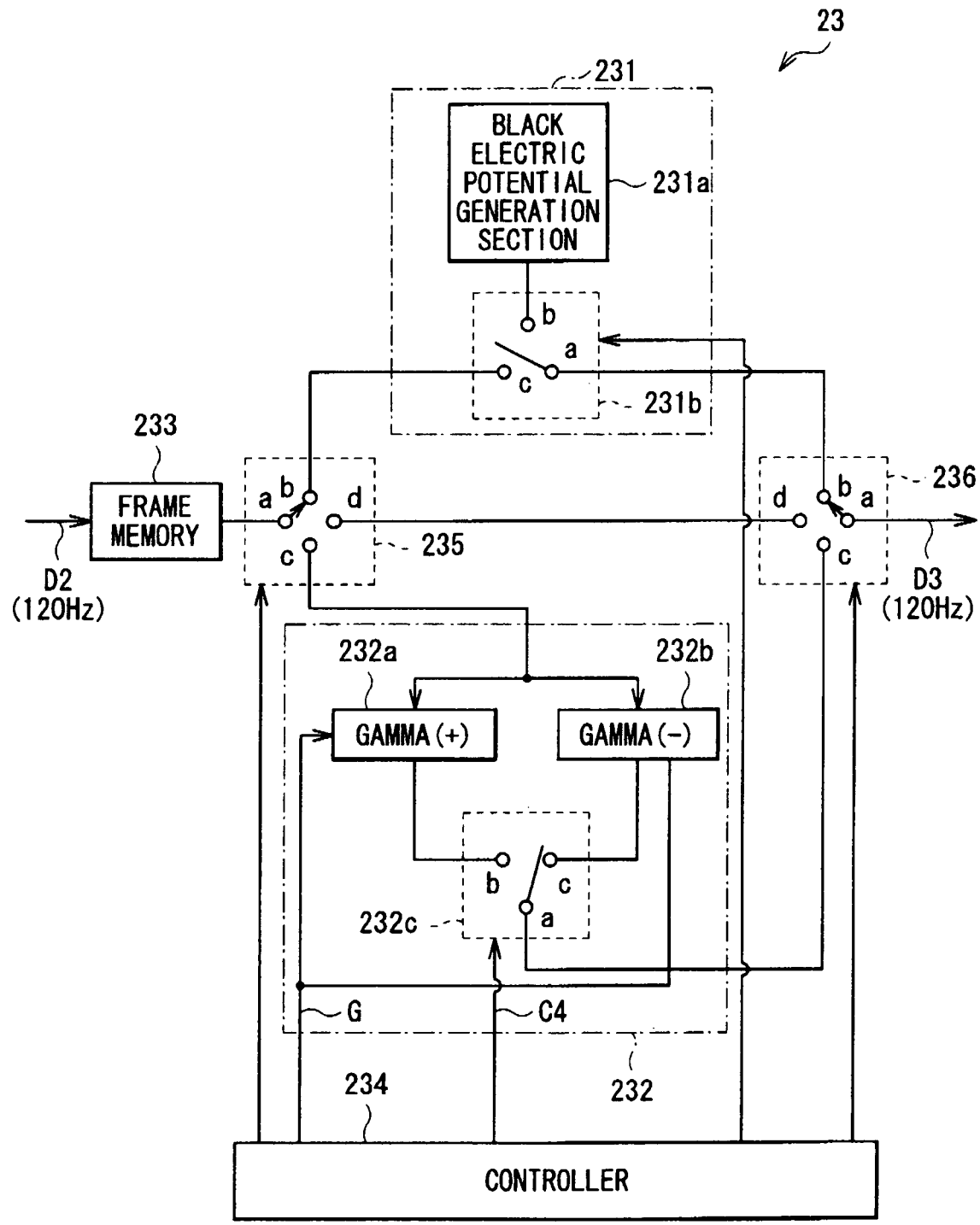
FIG. 4 is a block diagram illustrating a detailed circuit configuration of a display engine in the control section shown in FIG. 2.

FIG. 2 is referred again. The display engine 23 is a circuit performing a process so that the image as the moving image approaches image qualities of movies. For example as shown in FIG. 4, the display engine 23 includes a black insertion process section 231, an AB gamma correction section 232, a frame memory 233, a controller 234 controlling the entire display engine 23, and two switches 235 and 236. The frame memory 233 stores a plurality of frames of the image frames of the video signal D1. Both of writing on the frame memory 233 and reading from the frame memory 233 are performed with the frame rate of 120 Hz.

A mode in which the black insertion process section 231 or the AB gamma correction section 232 of the display engine 23 is active and functions effectively is referred to as a film projection mode or a cinema mode, and this mode corresponds to a specific example of "a second moving image display mode" in the present invention.

The two switches 235 and 236 synchronize with each other so as to perform a changeover by the control of the controller 234. Specifically, when the contact "a" of the switch 235 is connected to the contact "b", the contact "c", or the contact "d" of the switch 235, correspondingly the contact "a" of the switch 236 is connected to the contact "a", the contact "b", or the contact "c" of the switch 236 in a synchronized manner, respectively. When the contact "a" of the switch 235 and the contact "a" of the switch 236 are connected to the contact "b" of the switch 235 and the contact "b" of the switch 236, respectively, the black insertion section 231 is selected to be active, and thus the video signal D2 is subjected to the black insertion process and the result is outputted as a video signal D3 (the black insertion mode). When the contact "a" of the switch 235 and the contact "a" of the switch 236 are connected to the contact "c" of the switch 235 and the contact "c" of the switch 236, respectively, the AB gamma correction section 232 is selected to be active, and thus the video signal D2 is subjected to the AB gamma correction and the result is outputted as the video signal D3 (the AB gamma correction mode). Here, the AB gamma correction process corresponds to a specific example of "a pair-frames gamma process" in the present invention. When the contact "a" of the switch 235 and the contact "a" of the switch 236 are connected to the contact "d" of the switch 235 and the contact "d" of the switch 236, respectively, no process is performed on the video signal D2, and thus the inputted video signal D2 is outputted as a video signal D3 without any change (a film projection off-mode).

The black insertion process section 231 has a black electric potential generation section 231a generating an electric potential (black electric potential) corresponding to a black frame image, and a switch 231b. The switch 231b performs a changeover between the contact "b" (the black electric potential from the black electric potential generation section 231a) and the contact "c" (the video signal D2 read from the frame memory 233) with the frame rate of 120 Hz by the control of the controller 234. Thereby, twice-write image frame columns (F1, F1, F2, F2, F3, F3, . . . ) of the video signal D2 are alternately replaced with the black image frames so that black insertion image frame columns (F1, black, F2, black, F3, black, . . . ) are generated (refer to FIG. 9C which will be described later).

Figure 11:
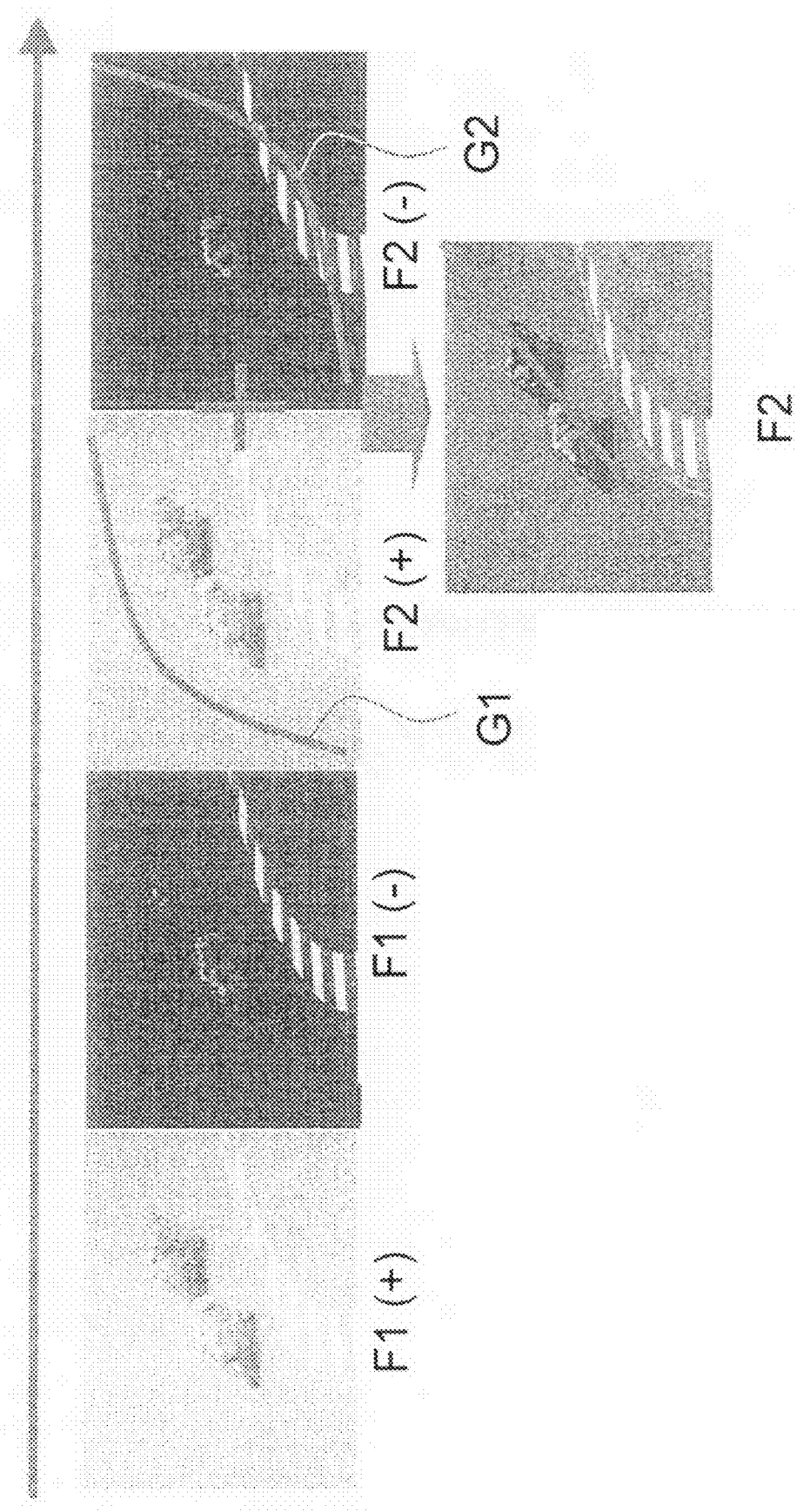
FIG. 11 is a view illustrating a typical AB gamma correction mode.

The AB gamma correction section 232 has a gamma (+) correction section 232a, a gamma (−) correction section 232b, and a switch 232c. The gamma (+) correction section 232a performs the gamma correction (white gamma correction) so as to increase the luminance of the video signal D2 read from the frame memory 233, and the gamma (−) correction section 232b performs the gamma correction (black gamma correction) so as to decrease the luminance of the video signal D2 read from the frame memory 233. In addition, a gamma correction value G used for these gamma corrections are imparted from the controller 234. The gamma correction value G is, for example, a value for defining gamma curves G1 and G2 shown in FIG. 11. The switch 232c alternately performs a changeover between the contact "b" (the image frame F1 (+) after being subjected to the white gamma correction) and the contact "c" (the image frame F2 (−) after being subjected to the black gamma correction) with the frame rate of 120 Hz by the control of the controller 234. Thereby, the twice-write image frame columns (F1, F1, F2, F2, F3, F3, . . . ) of the video signal D2 are converted to the image frame columns after being subjected to the AB gamma correction (F1(+), F1(−), F2(+), F2(−), F3(+), F3(−), . . . ) (refer to FIG. 9B which will be described later).

FIG. 2 is referred again. The OSD process section 25 generates menu screens (FIGS. 8A to 8G which will be described later) as a user interface, on the basis of the data supplied from the main controller 27. Through the menu screens, users make settings of various display modes. The synthesis section 26 superimposes (synthesizes) the video signal of the menu screen generated by the OSD process section 25, on the video signal D3 outputted from the display engine 23. The liquid crystal element drive section 24 drives the liquid crystal elements 14R, 14B, and 14G (FIG. 1) of the light modulator 14, respectively, on the basis of the video signal D4 supplied from the synthesis section 26.

The main controller 27 controls the entire control section 2, and is, for example, composed of one or a plurality of microprocessors. The memory 28 stores various control data and control programs which are necessary when the controller 27 controls each section in the control section 2. The memory 28 is, for example, composed of a nonvolatile memory system such as a flash memory, and a temporary memory system such as DRAM. The control data includes a display mode set data 281 defining a current image display mode (qualities of the moving image). The control program includes a user interface (UI) program 282 with which users may easily select the image display modes.

Next, the operation of the liquid crystal projector having the abovementioned configuration will be described.

With reference to FIG. 1, the schematic operation of the entire liquid crystal projector will be described. In the liquid crystal projector, the illumination light L0 emitted from the light source 11 is separated into the red light Lr and the green light Lg, and the blue light Lb by the dichroic mirror 121. Then, the red light Lr, and the green light Lg are separated by the dichroic mirror 122. The separated red light Lr enters into the liquid crystal element 14R through the reflection mirrors 132 and 133. The separated green light Lg directly enters into the liquid crystal element 14G. The separated blue light Lb enters into the liquid crystal element 14B through the reflection mirror 131. The primary color lights of the red light Lr, the green light Lg, and the blue light Lb are modulated in the liquid crystal elements 14R, 14G, and 14B, respectively, on the basis of the video signals for each of the colors supplied from the control section 2. The modulated primary color lights of the red light Lr, the green light Lg, and the blue light Lb are mixed by the dichroic prism 15 so as to be a display light Lout, and the display light Lout is projected on the screen 17 by the projection lens 16 so that the image display is performed on the basis of the input video signal Din.

Next, with reference to FIG. 2, and FIGS. 9A to 9D, the operation of the control section 2 will be descried. Here, each of FIGS. 9A to 9D shows an example of the image frame displayed by the selected display mode.

In FIG. 2, under the control of the main controller 27, the video signal input section 21 in the control section 2 performs an image adjustment process such as the white balance adjustment and the gamma correction on the input video signal Din, and performs scaling so that the input video signal Din has a predetermined horizontal and vertical size ratio. Then, the video signal input section 21 outputs the result as the video signal D1 having the frame rate of 60 Hz.

Under the control of the main controller 27, the frame rate converter 22 performs the frame rate conversion of double speed on the video signal D1 having the frame rate of 60 Hz, and outputs as the video signal D2 having the frame rate of 120 Hz. At that time, the main controller 27 refers to the display mode set data 281 of the memory 28 so as to determine which mode is set for the moving image display mode of the liquid crystal projector, and indicates the display mode to the controller 222 in the frame rate converter 22.

Figure 9A:
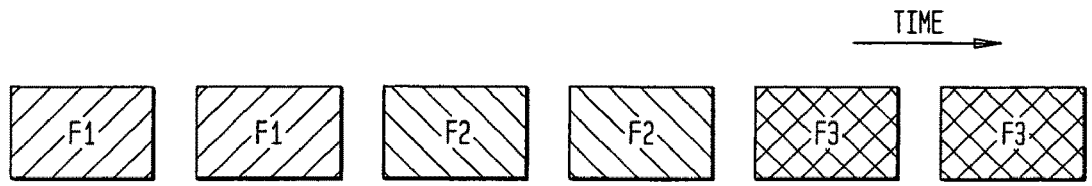
FIG. 9A is a view illustrating image frames in a simple twice-write mode.
Figure 9B:
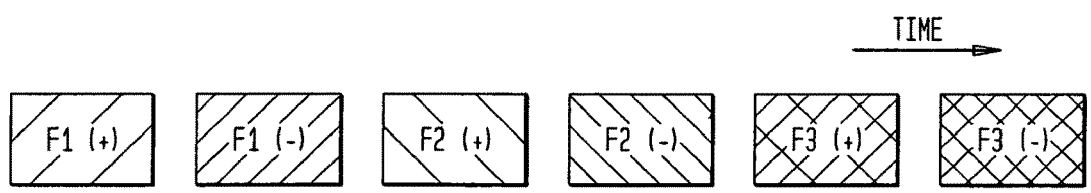
FIG. 9B is a view illustrating the image frames in an AB gamma correction mode of a film projection mode.
Figure 9C:
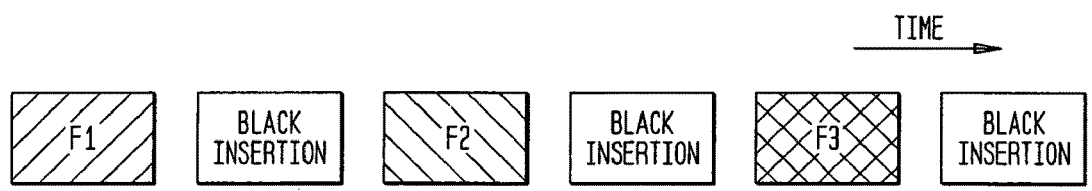
FIG. 9C is a view illustrating the image frames in a black insertion mode of the film projection mode.
Figure 9D:
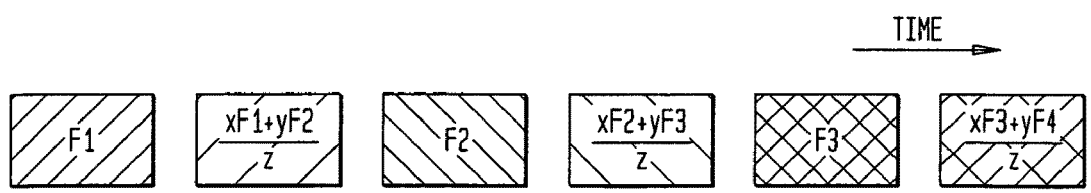
Figure 10:
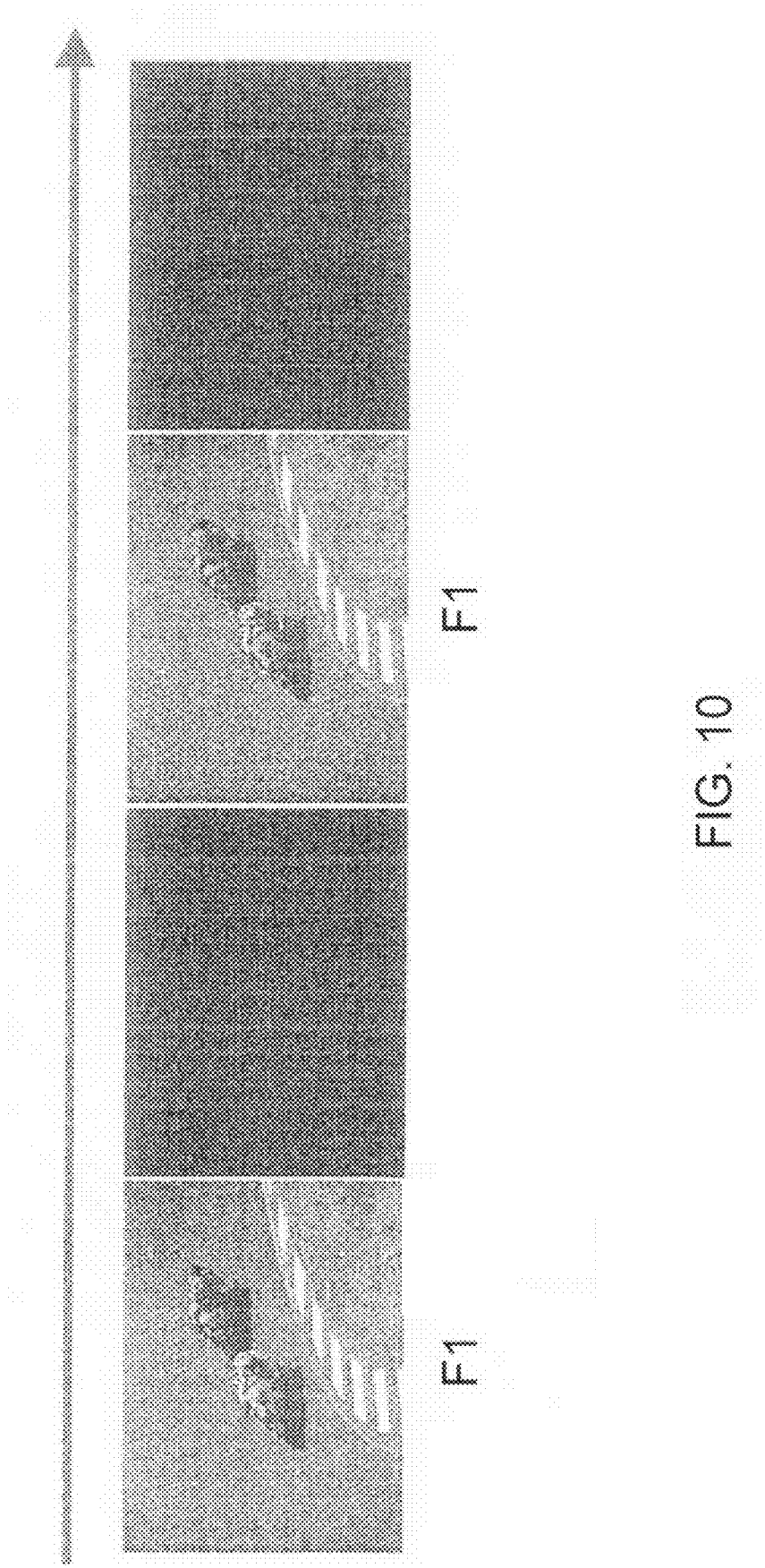
FIG. 10 is a view illustrating a typical black insertion mode.

When the display mode indicated by the main controller 27 is the motion enhance on-mode, the controller 222 in the frame rate converter 22 controls the frame interpolation section 221 so as to generate the intermediate frame F12 from the pair of image frames (F1 and F2) and insert the intermediate frame F12 between the original pair of image frames (F1 and F2) in sequence. Thereby, the frame rate of the original video signal is doubled as 120 Hz (FIG. 9D). On the other hand, when the display mode indicated by the main controller 27 is the motion enhance off-mode, the controller 222 performs the twice write process in which each of the image frames (F1, F2, F3, . . . ) is read and outputted twice with the frame rate of 121 Hz so that the frame rate of the original video signal is doubled as 120 Hz (FIG. 9A). In addition, as will be described later, when the film projection mode is selected, the motion enhance mode automatically becomes off-state. Accordingly, it is avoidable that the intermediates frames generated in the frame rate converter 22 are replaced with the black frames in the display engine 23 as shown in FIG. 14B, and the generated intermediate frames become wasteful as a result.

Under the control of the main controller 27, the display engine 23 performs the black insertion process or the AB gamma correction process on the video signal D2, or simply permits the video signal D2 to proceed without performing any process, so as to output the result as the video signal D3. At that time, the main controller 27 refers to the display mode set data 281 in the memory 28 so as to determine which mode is set for the moving image display modes of the liquid crystal projector, and indicates the display mode to the controller 234 in the display engine 23.

When the display mode indicated by the main controller 27 is the film projection on-mode, the controller 234 in the display engine 23 performs the black insertion process or the AB gamma correction process on the video signal D2 having the frame rate of 120 Hz from the frame rate converter 22 so as to output the result as the video signal D3. More specifically, when the black insertion mode of the film projection on-mode is indicated, the black insertion process is performed (FIG. 9C) in which the twice-write image frame columns (F1, F1, F2, F2, F3, F3, . . . ) are alternately replaced with the black image frames so as to generate the black insertion image frame columns (F1, black, F2, black, F3, black, . . . ) by the black insertion process section 231. On the other hand, when the AB gamma correction mode of the film projection on-mode is indicated, the AB gamma correction process is performed (FIG. 9B) in which the twice-write image frame columns (F1, F1, F2, F2, F3, F3, . . . ) are converted to the AB gamma correction image frame columns (F1(+), F1(−), F2(+), F2(−), F3(+), F3(−), . . . ) by the AB gamma correction section 232. When the indicated display mode is the film projection off-mode, the controller 234 outputs the video signal D2 as the video signal D3 as it is.

The video signal D3 outputted from the display engine 23 is sent as the video signal D4 to the liquid crystal element drive section 24 through the synthesis section 26. The liquid crystal element drive section 24 drives the liquid crystal elements 14R, 14B, and 14G (FIG. 1) of the projection display optical system 1 on the basis of the video signal D4, respectively. Thereby, the color image is projected and displayed on the screen 17. In addition, in the above description, the frame rate of the video signal D3 outputted from the display engine 23 is described as 120 Hz for convenience sake. However, the video signal D3 is actually converted into a polarity-reversed drive signal having the frame rate of 240 Hz which is doubled by the function called a frame doubler, and then sent to the liquid crystal element drive section 24.

The main controller 27 reads the UI program 282 in the memory 28, according to the display mode selected by a user operating the remote commander 3 (FIG. 1), and performs the user interface function for selecting the display mode. Specifically, the main controller 27 controls the OSD process section 25 so that the menu screens (FIGS. 8A to 8G) for selecting the display mode are generated and supplied to the synthesis section 26. The synthesis section 26 superimposes the menu screen on the video signal D3, and outputs the result as the video signal D4. Thereby, the menu screen which is superimposed on the image is displayed on the screen 17. The main controller 27 determines the display mode of the liquid crystal projector according to the operation of the remote commander 3 by a user, and stores the display mode as the display mode set data 281 in the memory 28. The main controller 27 also indicates the display mode to the frame rate converter 22 and the display engine 23. In addition, in the above description, although the menu screen is superimposed on the original image by the synthesis section 26, the image screen may be completely switched to the menu screen.

Next, with reference to FIG. 5, the operation of the user interface function of the liquid crystal projector in FIG. 1 will be described.

Figure 5:
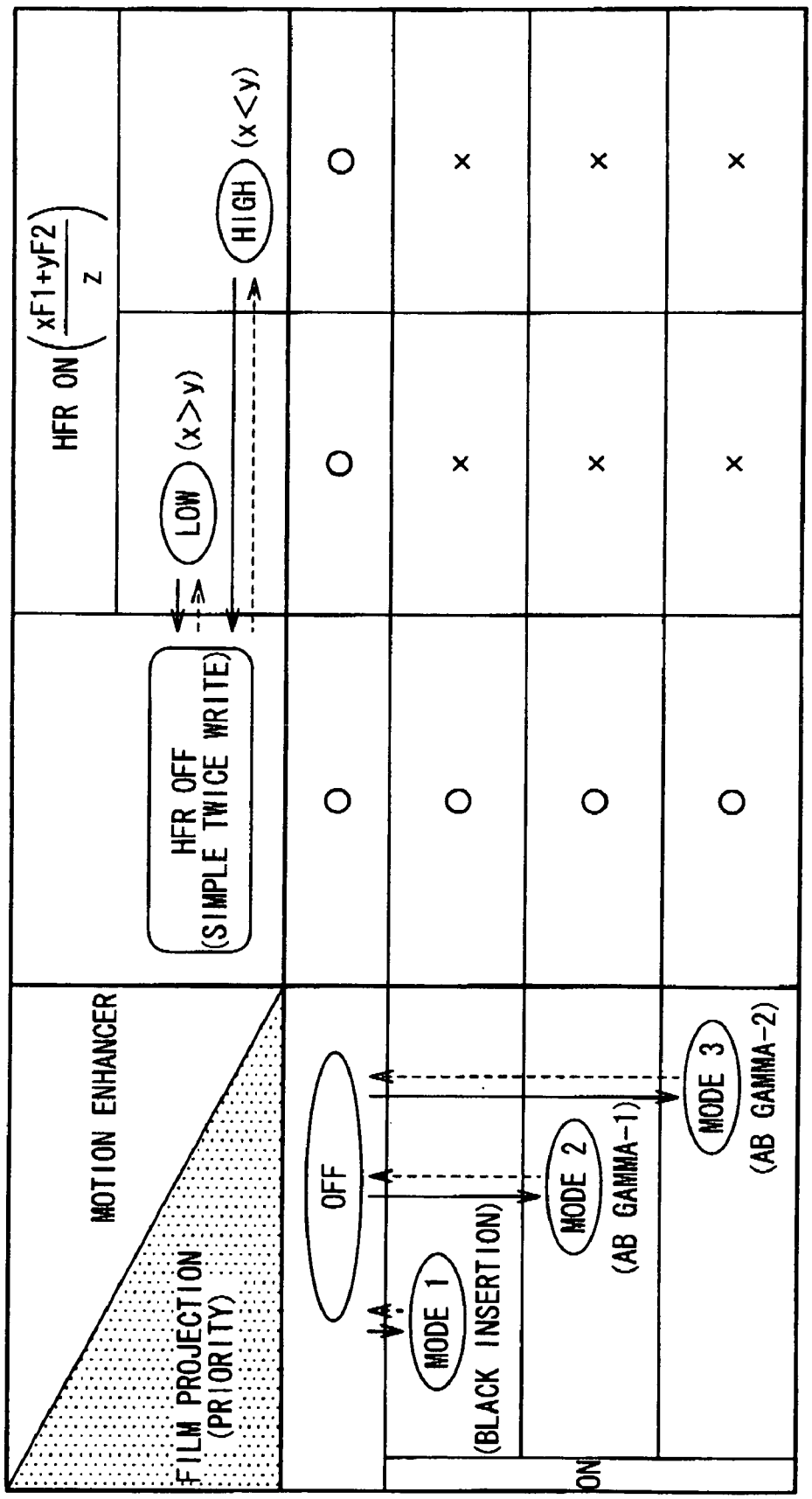
FIG. 5 is a view illustrating a mutual relationship between a plurality of display modes equipped on the liquid crystal projector of FIG. 1.

FIG. 5 shows a mutual relationship of a plurality of display modes which are possible in the liquid crystal projector. In the figure, the vertical direction shows the state regarding the film projection mode, and the horizontal direction shows the state regarding the motion enhance mode.

The film projection mode includes one off-mode state and three on-mode states. There are three on-mode states, a mode 1, a mode 2 and a mode 3. The mode 1 is the black insertion mode. Both of the mode 2 and the mode 3 are the AB gamma correction mode, but they are different each other in terms of the extent of the AB gamma correction. For example, the mode 2 is a mode (AB gamma-1) in which the white gamma correction and the black gamma correction are performed on the basis of relatively gentle gamma curves G1 and G2 (FIG. 11), and the mode 3 is a mode (AB gamma-2) in which the white gamma correction and the black gamma correction are performed on the basis of relatively steep gamma curves G1 and G2. However, the film projection mode is not limited these, and any necessary types of AB gamma correction modes with necessary features may be arbitrarily prepared.

On the other hand, the motion enhance mode includes one HFR off-mode state and two HFR on-mode states. There are two HFR on-mode states, a low mode and a high mode. The low mode is, for example, a case where the coefficients (x and y) in the intermediate frame $F12=(xF1+yF2)/z$ are in the relationship of x>y (that is, the former frame is dominant). The high mode is, for example, a case where the coefficients (x and y) in the intermediate frame $F12=(xF1+yF2)/z$ are in the relationship of x<y (that is, the latter frame is dominant). However, the motion enhance mode is not limited to these, and any necessary types of modes for generating the intermediate frames having necessary features may be arbitrarily prepared by arbitrarily selecting the coefficients (x, y, and z).

As shown in FIG. 5, when the display mode is selected, the film projection mode takes a priority over the motion enhance mode. That is, when the film projection mode becomes on-state (one of the modes 1 to 3), the motion enhance mode may take only the HFR off-state, but may not take the HFR on-state (the low mode or the high mode). On the other hand, when the film projection mode becomes off-state, the motion enhance mode may take both of the HFR on-state and the HFR off-state.

In the case where the film projection mode is off-state and the motion enhance mode is HFR on-state (the low mode or the high mode), when the film projection mode is changed to on-state (one of the modes 1 to 3), the motion enhance mode is automatically changed to the HFR off-state. After that, when the film projection mode is changed to off-state again, the motion enhance mode automatically returns to the original HFR on-state (the low mode or the high mode). Hereinafter, this operation will be described in detail with reference to FIG. 6, FIGS. 7A to 7B, FIGS. 8A to 8G, and FIGS. 9A to 9D.

Figure 6:
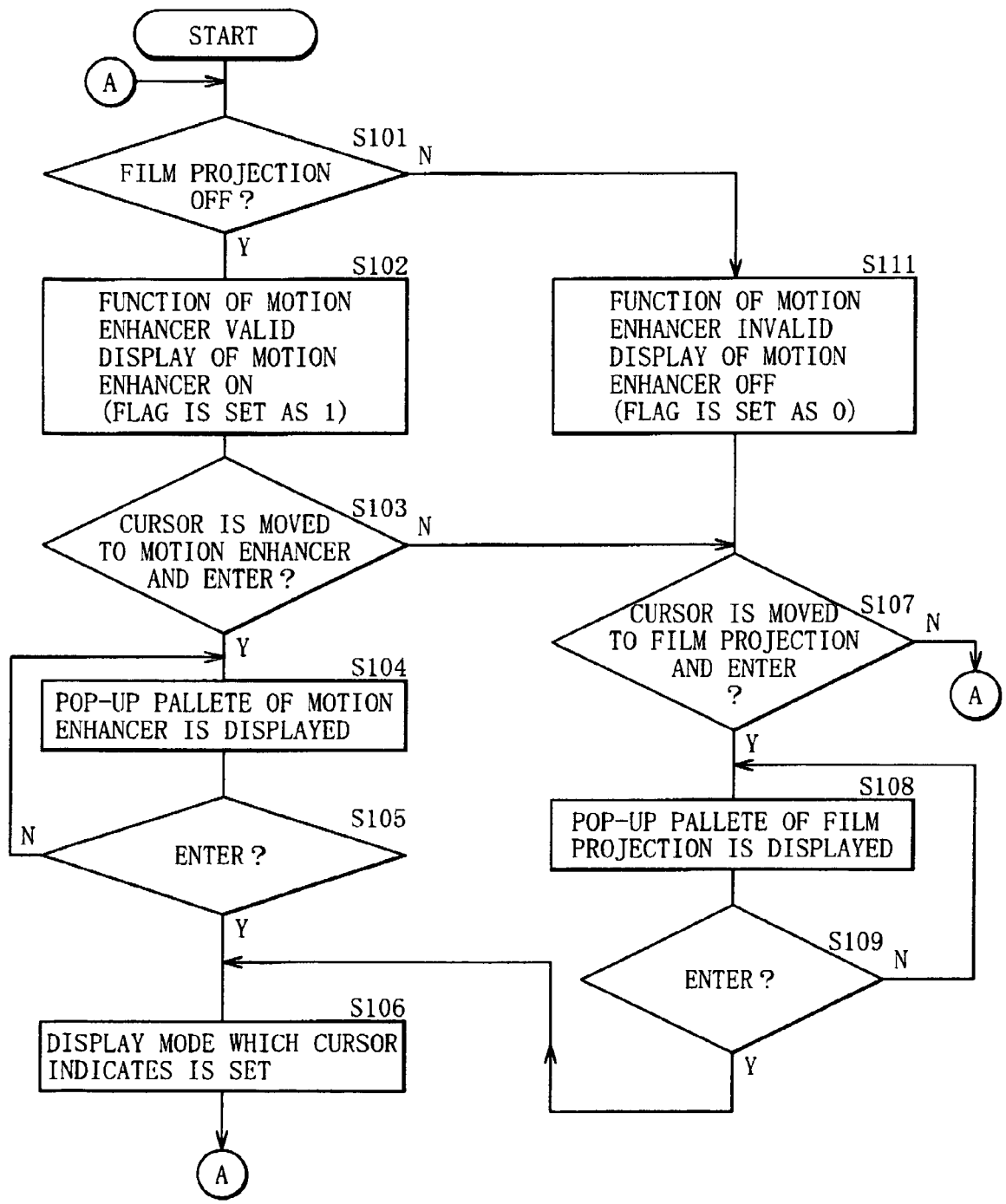
FIG. 6 is a flow chart showing processes when a main controller in the control section shown in FIG. 2 performs a user interface function.
Figure 7A:
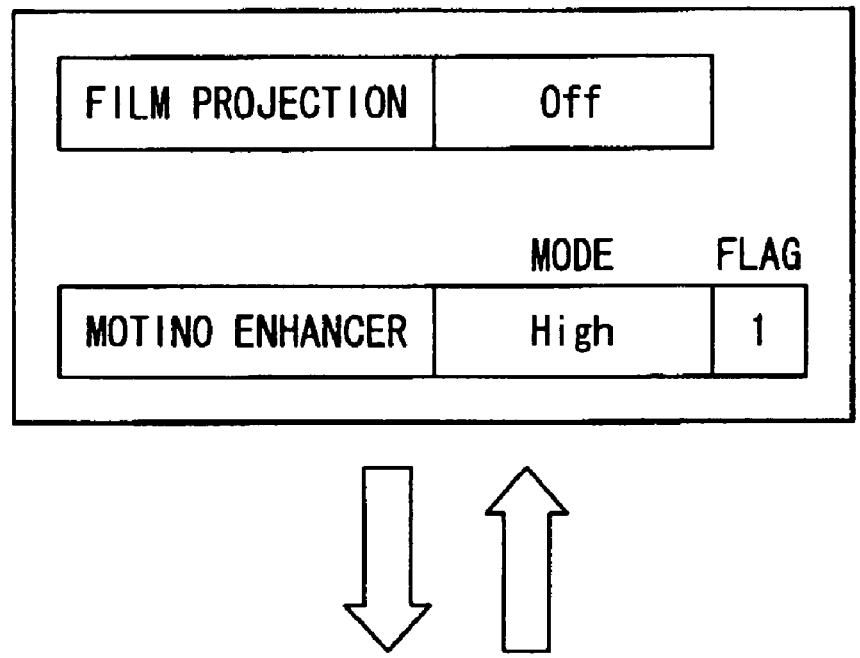
FIGS. 7A and 7B are views illustrating a change of a set data of display modes stored in a memory of the control section shown in FIG. 2.
Figure 7B:
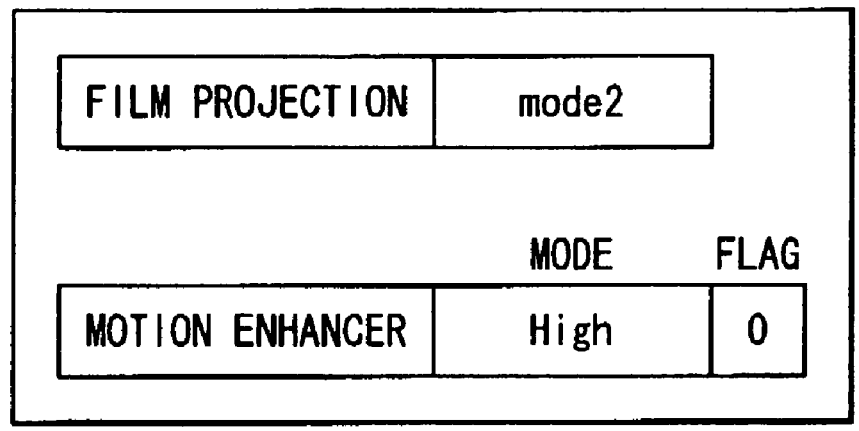

FIG. 6 shows a flow of the process of the main controller 27, when a user selects the display mode with the user interface function. Each of FIGS. 7A and 7B shows an example when the content of the display mode set data 281 stored in the memory 28 (FIG. 2) of the control section 2 is changed. Each of FIGS. 8A to 8G shows an example of the menu screens displayed in each step for selecting the display mode.

Figure 8A:
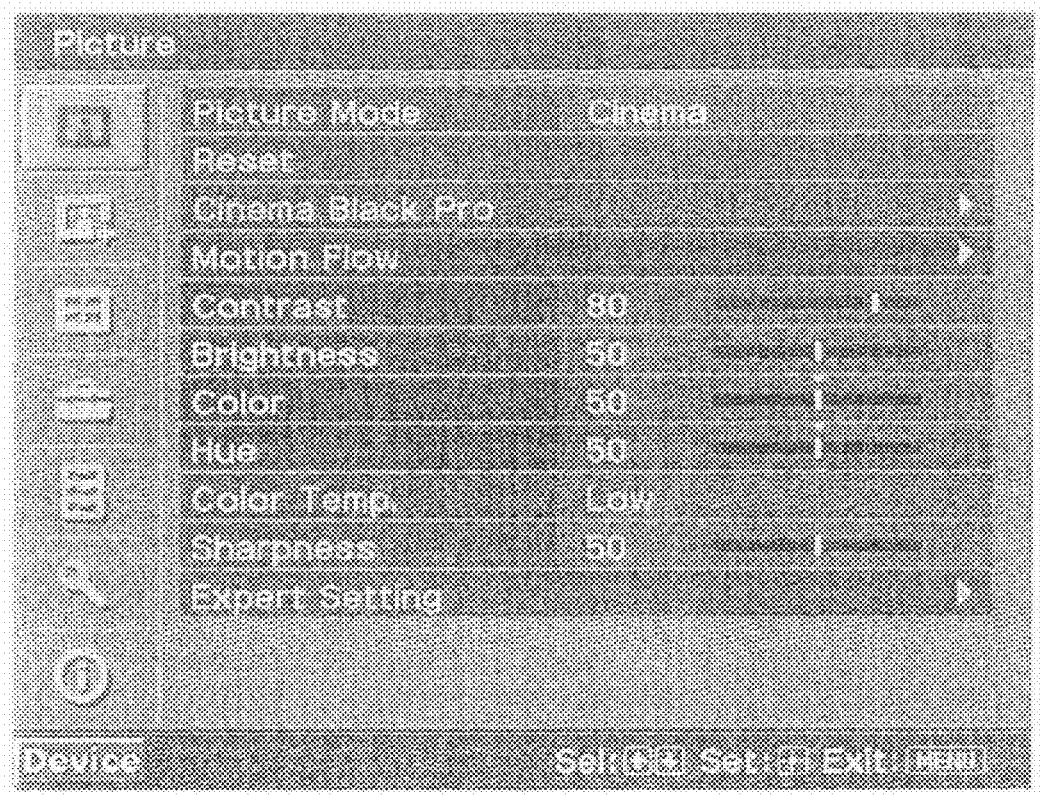
FIG. 8A is a view illustrating an example of a menu screen in the liquid crystal projector of FIG. 1.
Figure 8B:
FIG. 8B is a view illustrating another example of the menu screen in the liquid crystal projector of FIG. 1.

When a user operates the remote commander 3 (FIG. 1) and presses the menu button (not shown in the figure), the main controller 27 (FIG. 2) controls the OSD process section 25 so as to display the menu screen as shown in FIG. 8A. Here, when a cursor is moved to "Motion Flow" and "Enter" is pressed, the main controller 27 refers to the display mode set data 281 (FIGS. 7A and 7B) and displays the menu screen for setting "Motion Flow" as shown in FIG. 8B. In FIG. 8B, an example is shown where both of the film projection and the motion enhancer are off-state. In the example, the frame rate converter 22 in FIG. 2 performs the twice-write process, and the display engine 23 does nothing (permits the video signal to proceed). As a result, the display mode is set as the simple twice-write mode (FIG. 9A).

When "Film Projection" becomes off-state (step S101; Y), a flag of the set data of the motion enhancer is set as "1" as shown in FIG. 7A. Thus, the function of the motion enhancer becomes valid, and an item "Motion Enhancer" is displayed on the menu screen (step S102).

Figure 8C:
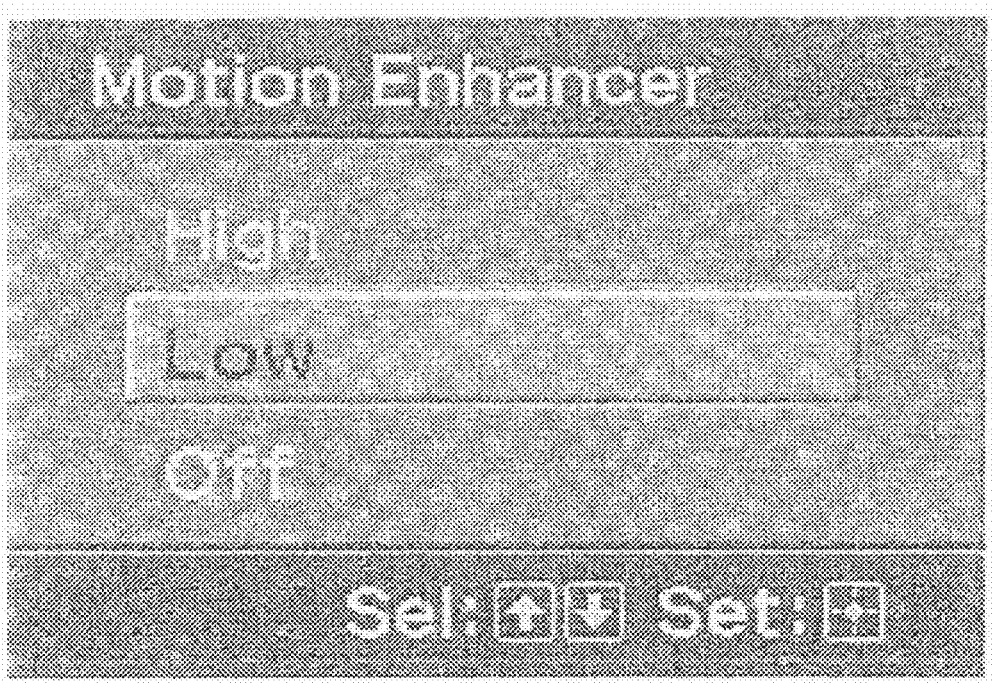
FIG. 8C is a view illustrating still another example of the menu screen in the liquid crystal projector of FIG. 1.
Figure 8D:
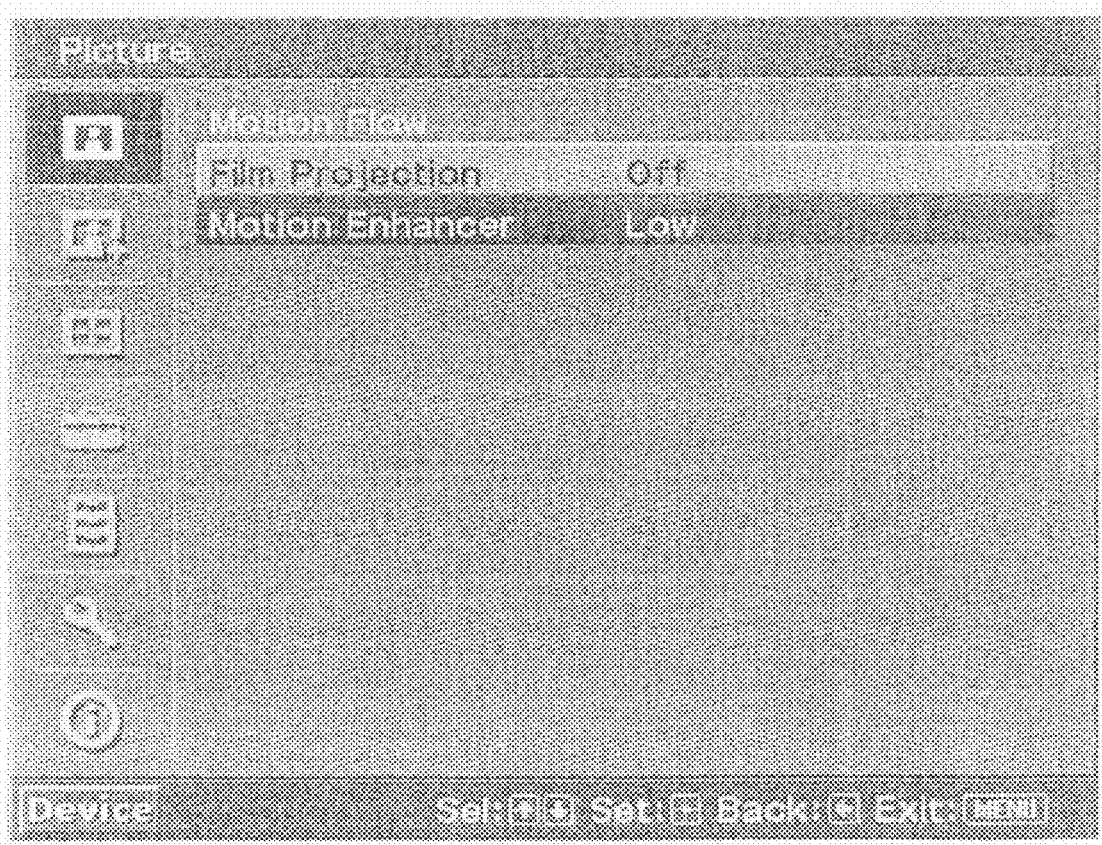
FIG. 8D is a view further illustrating still another example of the menu screen in the liquid crystal projector of FIG. 1.

When the cursor is moved to "Motion Enhancer" in FIG. 8B and "Enter" is pressed (step S103; Y), the main controller 27 displays a hop-up palette for setting "Motion Enhancer" as shown in FIG. 8C (step S104). In the hop-up palette, three alternatives of display modes, "High", "Low", and "Off" are displayed. Here, when the cursor is moved to one of the items and "Enter" is pressed (steps S105; Y), the main controller 27 determines the display mode where the cursor indicates, and the content of the display mode set data 281 (FIGS. 7A and 7B) is changed (step S106). For example, when "Low" in the hop-up palette in FIG. 8C is selected, this is also reflected to the menu screen for setting "Motion Flow" (FIG. 8D). Thereby, the display mode is set as the "Motion Enhancer Low" mode, and the intermediate frames are alternately inserted between the image frames as show in FIG. 9D, and thus the smooth image display is obtained.

Figure 8E:
FIG. 8E is a view further illustrating still another example of the menu screen in the liquid crystal projector of FIG. 1.

Further, for example, when the cursor is moved to "Film Projection" in FIG. 8D, and "Enter" is pressed (step S103; N, step S107; Y), the main controller 27 displays the hop-up palette for setting "Film Projection" as shown in FIG. 8E (step S108). In the hop-up palette, four alternatives of the display modes, "Mode 1", "Mode 2", "Mode 3", and "Off" are displayed.

Figure 8F:
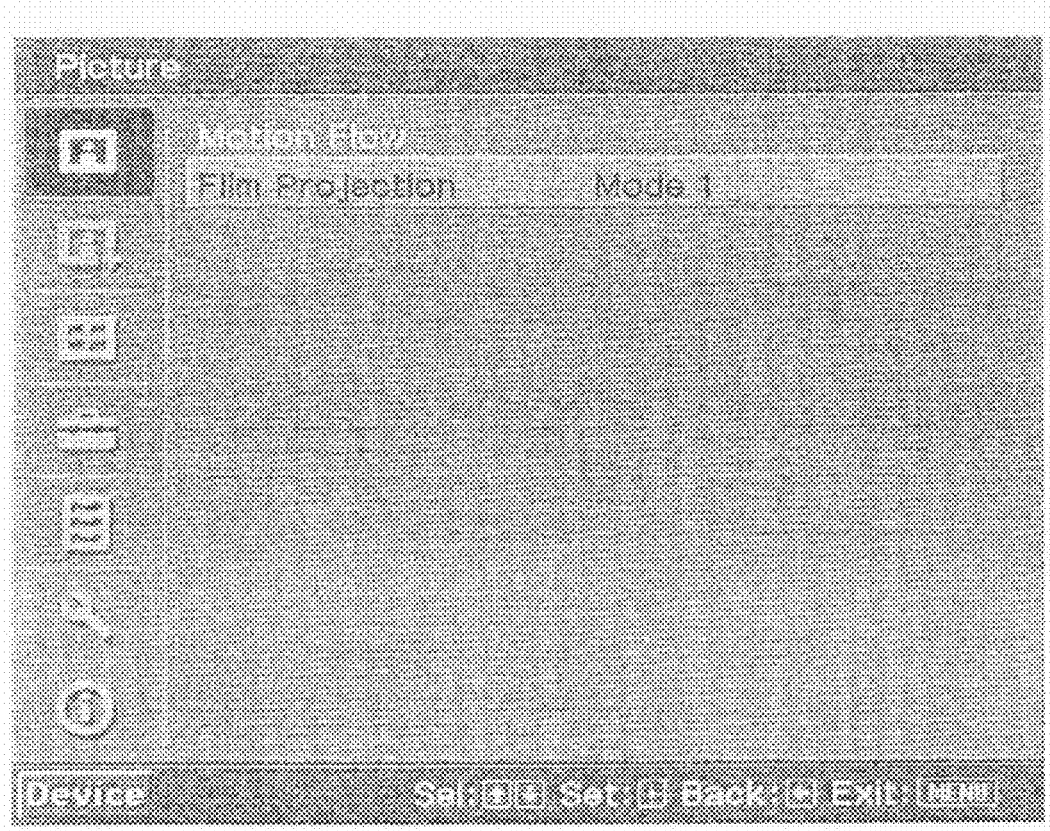
FIG. 8F is a view further illustrating still another example of the menu screen in the liquid crystal projector of FIG. 1.

Here, when the cursor is moved to one of the items and "Enter" is pressed (step S109; Y), the main controller 27 determines the display mode where the cursor indicates, and the content of the display mode set data 281 (FIGS. 7A and 7B) is changed (step S106). For example, when "Mode 1" in the hop-up palette in FIG. 8E is selected, this is also reflected to the menu screen for setting "Motion Flow" (FIG. 8F). Thereby, the display mode is set as "Film Projection Mode 1", that is, the black insertion mode (FIG. 9C). In addition, when "Mode 2" or "Mode 3" is selected, the display mode is set as the AB gamma correction mode (AB gamma-1 or AB gamma-2) (FIG. 9B). In this case, because "Film Projection" becomes on-state (step S101; N), the main controller 27 sets the flag of the set data of the motion enhancer as "0" as show in FIG. 7B so that the function of the motion enhancer becomes invalid, and the item of "Motion Enhancer" on the menu screen is deleted (step S110). As a result, as shown in FIG. 8F, only "Film Projection Mode 1" is displayed on the menu screen for setting "Motion Flow", but the display of "Motion Enhancer" is deleted.

Figure 8G:
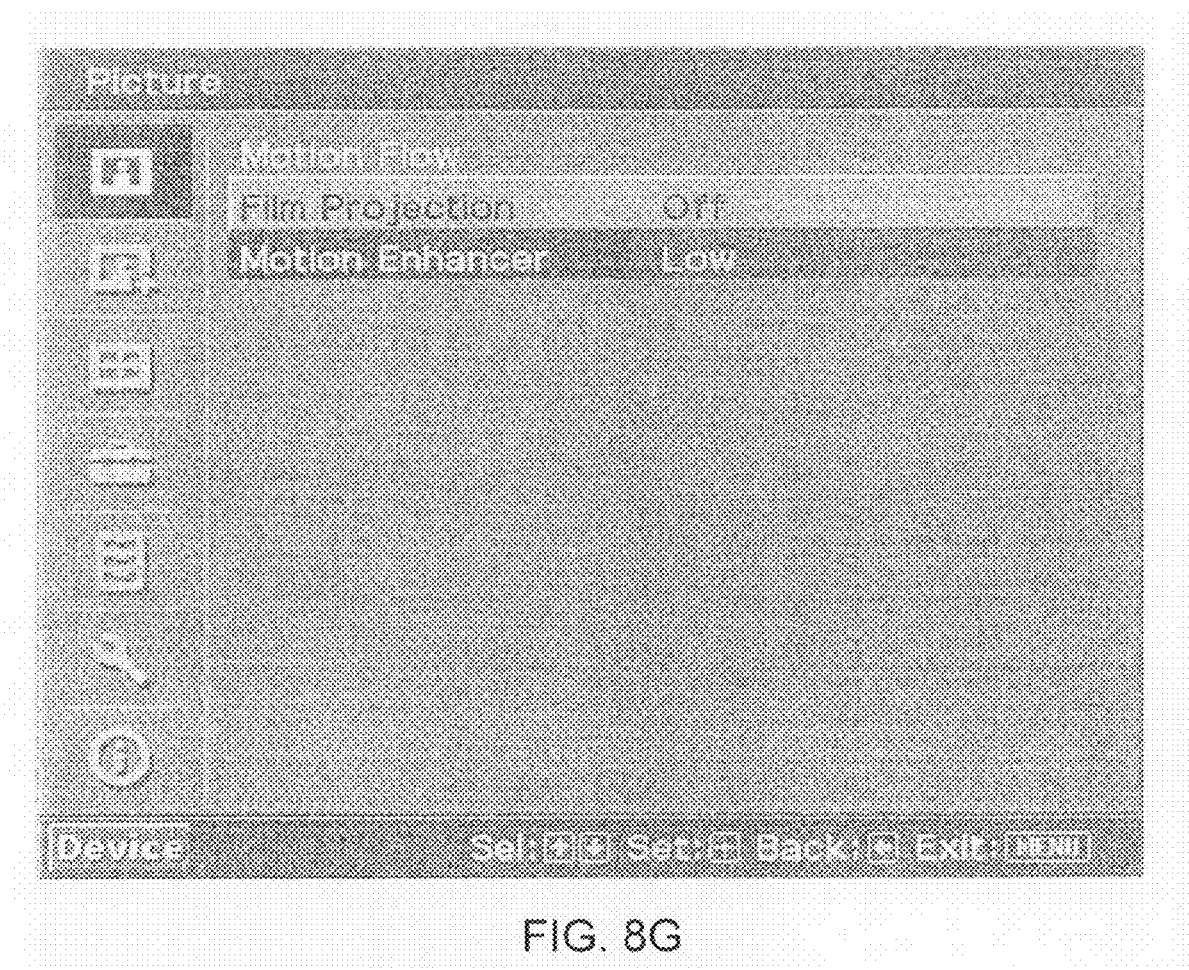
FIG. 8G is a view further illustrating still another example of the menu screen in the liquid crystal projector of FIG. 1.

Further, for example on the menu screen of FIG. 8F, when the operation is performed so that "Film Projection" is changed to "Off" (step S101; Y), the main controller 27 returns the flag of the set data of the motion enhancer to "1" as shown in FIG. 7A so that the function of the motion enhancer becomes valid, and the item of "Motion Enhancer" is displayed on the menu screen (step S102). As a result, as shown in FIG. 8G, the display of "Motion Enhancer Low" returns on the menu screen for setting "Motion Flow".

In this way, according to the liquid crystal projector of the embodiment of the present invention, because the user interface function in which the film projection mode is selected with priority over the motion enhancer is prepared, the user interface for setting the display mode suitable for the product characteristics of the projector may be provided. Therefore, even typical users different from maniacs who prefer cinema-like images hardly become irresolute when selecting one of the display modes according to the image sources, and thus it is avoidable that confusion is brought to users using the products.

Unlike the case of the user interface in which both of the display modes may be selected at the same time, it is avoidable that the operation of the hardware so as to realize each of the functions becomes wasteful. That is, when the film projection mode is selected, the motion enhance mode automatically becomes off-state. Thereby, it is avoidable that the generated intermediate frames are replaced with the black frames as shown in FIG. 14B, and the generated intermediate frames become wasteful as a result. Therefore, wasting of hardware resources may be prevented, and excellent product characteristics may be obtained.

Hereinbefore, although the present invention is described with the embodiment, the present invention is not limited to the embodiment as various modifications are available. For example, in the embodiment, the configuration of the control section 2 is exemplified as a hardware realizing the user interface so as to select the motion enhancer or the film projection mode as shown in FIG. 2. However, the configuration is not limited to this, as long as the hardware realizes the user interface in which the film projection mode is selected with priority over the motion enhancer. The hardware realizing the motion enhancer and the film projection mode is not limited to the configurations of the frame rate converter 22 and the display engine 23 as shown in FIGS. 2 to 4.

In the example of FIG. 1, the transmissive liquid crystal elements 14G, 14B and 14B are used in the projection display optical system 1 of the liquid crystal projector. However, the present invention is not limited to these, and the reflective liquid crystal elements may also be used. Further, the present invention is applicable to not only the liquid crystal projector, but also the projector of another method (for example, one using DMD (digital mirror device) elements).

It should be understood by those skilled in the art that various modifications, combinations, sub-combinations and alterations may occur depending on design requirements and other factors insofar as they are within the scope of the appended claims or the equivalents thereof.

The invention claimed is:

1. A projection display comprising:
a frame rate conversion means for selectively performing a first frame rate conversion process or a second frame rate conversion process, the first frame rate conversion process increasing a frame rate by interpolating an intermediate image frame between image frames of an input video signal, the second frame rate conversion process increasing the frame rate by repeatedly outputting each image frame of the input video signal along a time axis;
an image process means for selectively performing a black insertion process or a pair-frames gamma process, and outputting a result as a pair of consecutive image frames, the black insertion process inserting a black frame between image frames of the input video signal, the pair-frames gamma process performing a pair of gamma conversion processes, each having different gamma characteristics, to a series of image frames in the input video signal;
a projection display means for projecting and displaying an image on the basis of the video signal processed by the frame rate conversion means or the image process means; and
a control means for controlling the frame rate conversion means or the image process means according to a selected operation on a menu screen, the control means having a user interface function for displaying the menu screen which enables a user to select the first or the second frame rate conversion processes by the frame rate conversion means, the black insertion process, or the pair-frames gamma process by the image process means,
wherein the control means performs the user interface function so that the black insertion process or the pair-frames gamma process by the image process means is selected with priority over the first frame rate conversion process by the frame rate conversion means.

2. The projection display according to claim 1, wherein, in the case that a mode for performing the black insertion process or the pair-frames gamma process is selected on the menu screen, the control means hides a selection button which enables a mode for performing the first frame rate conversion process to be selected.

3. The projection display according to claim 1, wherein, in the case that a mode for performing the first frame rate conversion process is selected on the menu screen, when a mode for performing the black insertion process or the pair-frames gamma process is selected, then the control means makes transition to the mode for performing the black insertion process or the pair-frames gamma process.

4. The projection display according to claim 3, wherein, in the case that the mode for performing the black insertion process or the pair-frames gamma process is selected on the menu screen and executed, and once the mode is deselected, then the control means returns to the mode for performing the first frame rate conversion process.

5. The projection display according to claim 1, wherein the control means displays the menu screen based on the user interface functions through use of the projection display means.

6. The projection display according to claim 1, wherein the frame rate conversion means converts the frame rate of the input video signal to have a double frame rate.

7. The projection display according to claim 1, wherein the pair-frames gamma process by the image process means performs a white gamma conversion for increasing a luminance of an image frame by converting the image frame and a black gamma conversion for decreasing a luminance of an image frame by converting the image frame, and outputting the result as the pair of consecutive image frames.

8. A non-transitory processor-readable recording medium comprising a projection display control program applied to a projection display, the program comprising processor control instructions to cause a processor to execute the program, the program including:
- a frame rate conversion means for selectively performing a first frame rate conversion process or a second frame rate conversion process, the first frame rate conversion process increasing a frame rate by interpolating an intermediate image frame between image frames of an input video signal, the second frame rate conversion process increasing the frame rate by repeatedly outputting each image frame of the input video signal along a time axis;
- an image process means for selectively performing a black insertion process or a pair-frames gamma process, and outputting a result as a pair of consecutive image frames, the black insertion process inserting a black frame between image frames of the input video signal, the pair-frames gamma process performing a pair of gamma conversion processes, each having different gamma characteristics, to a series of image frames in the input video signal;
- a projection display means for projecting and displaying an image on the basis of the video signal processed by the frame rate conversion means or the image process means; and
- a control means for controlling the frame rate conversion means or the image process means,
- the projection display control program being configured to be executed by the control means, and comprising
- performing a user interface function for displaying a menu screen which enables a user to select the first or the second frame rate conversion processes by the frame rate conversion means, the black insertion process or the pair-frames gamma process by the image process means, and
- controlling the frame rate conversion means or the image process means according to a selected operation on the menu screen,
- wherein the user interface function is executed so that the black insertion process or the pair-frames gamma process by the image process means is selected with priority over the first frame rate conversion process by the frame rate conversion means.

9. A projection display comprising:
- a frame rate conversion section selectively performing a first frame rate conversion process or a second frame rate conversion process, the first frame rate conversion process increasing a frame rate by interpolating an intermediate image frame between image frames of an input video signal, the second frame rate conversion process increasing the frame rate by repeatedly outputting each image frame of the input video signal along a time axis;
- an image process section selectively performing a black insertion process or a pair-frames gamma process, and outputting a result as a pair of consecutive image frames, the black insertion process inserting a black frame between image frames of the input video signal, the pair-frames gamma process performing a pair of gamma conversion processes, each having different gamma characteristics, to a series of image frames in the input video signal;
- a projection display section projecting and displaying an image on the basis of the video signal processed by the frame rate conversion section or the image process section; and
- a control section controlling the frame rate conversion section or the image process section according to a selected operation on a menu screen, the control section having a user interface function for displaying the menu screen which enables a user to select the first or the second frame rate conversion processes by the frame rate conversion section, the black insertion process, or the pair-frames gamma process by the image process section,
- wherein the control section performs the user interface function so that the black insertion process or the pair-frames gamma process by the image process section is selected with priority over the first frame rate conversion process by the frame rate conversion section.

10. A non-transitory processor-readable recording medium comprising a projection display control program applied to a projection display, the program comprising processor control instructions to cause a processor to execute the program, the program including:
- a frame rate conversion section selectively performing a first frame rate conversion process or a second frame rate conversion process, the first frame rate conversion process increasing a frame rate by interpolating an intermediate image frame between image frames of an input video signal, the second frame rate conversion process increasing the frame rate by repeatedly outputting each image frame of the input video signal along a time axis;
- an image process section selectively performing a black insertion process or a pair-frames gamma process, and outputting a result as a pair of consecutive image frames, the black insertion process inserting a black frame between image frames of the input video signal, the pair-frames gamma process performing a pair of gamma conversion processes, each having different gamma characteristics, to a series of image frames in the input video signal;
- a projection display section projecting and displaying an image on the basis of the video signal processed by the frame rate conversion section or the image process section; and
- a control section controlling the frame rate conversion section or the image conversion section,
- the projection display control program being configured to be executed by the control section, and comprising
- performing a user interface function for displaying a menu screen which enables a user to select the first or the second frame rate conversion processes by the frame rate conversion section, the black insertion process or the pair-frames gamma process by the image process section, and
- controlling the frame rate conversion section or the image process section according to a selected operation on the menu screen,
- wherein the user interface function is executed so that the black insertion process or the pair-frames gamma process by the image process section is selected with priority over the first frame rate conversion process by the frame rate conversion section.

\* \* \* \* \*